United States Patent [19]

Sugimoto et al.

[11] 4,078,399
[45] Mar. 14, 1978

[54] ABSORPTION TYPE REFRIGERATOR

[75] Inventors: Shigeo Sugimoto; Michihiko Aizawa, both of Ibaraki, Japan

[73] Assignee: Hitachi, Ltd., Japan

[21] Appl. No.: 721,407

[22] Filed: Sep. 8, 1976

[30] Foreign Application Priority Data

Sep. 22, 1975 Japan .................. 50-113690

[51] Int. Cl.² .......................................... F25B 15/00
[52] U.S. Cl. .................................................. 62/476
[58] Field of Search ................ 62/101, 141, 476, 148

[56] References Cited

U.S. PATENT DOCUMENTS

| 3,334,492 | 8/1967 | Leonard, Jr. | 62/148 |
| 3,740,966 | 6/1973 | Prauda | 62/476 |
| 3,828,575 | 8/1974 | Malcosky et al. | 62/476 |
| 3,964,273 | 6/1976 | Merrick | 62/476 |
| 3,990,263 | 11/1976 | Ainbinder et al. | 62/476 |

Primary Examiner—Lloyd L. King
Attorney, Agent, or Firm—Craig & Antonelli

[57] ABSTRACT

An arrangement of an evaporator, an absorber, a generator and a condenser within a shell of a single effect absorption type refrigerator or a multiple effect absorption type refrigerator, such as a double effect or triple effect type refrigerator. Positioned on opposite sides within the shell are an evaporator and a generator, and disposed therebetween are an absorber and a condenser. This arrangement presents an improved efficiency in terms of space to provide a compact type refrigerator.

14 Claims, 8 Drawing Figures

ABSORPTION TYPE REFRIGERATOR

BACKGROUND OF THE INVENTION

1. FIELD OF THE INVENTION

This invention relates to a single or multiple effect absorption type refrigerator, and more particularly to an arrangement of respective components included in a shell of a single or multiple effect absorption type refrigerator.

2. DESCRIPTION OF THE PRIOR ART

There are many types of absorption type refrigerators which use steam or combustion gases as a heat source, and ones of a single effect type, in which a single generator is used, and of a multiple effect type, in which two or more generators are used. Hitherto, many attempts have been proposed for arranging main components, such as an evaporator, an absorber, a generator, and a condensor within a shell of an absorption type refrigerator. In terms of the arrangement of the main components, refrigerators may be classified into single shell type ones in which an evaporator, an absorber, a generator and a condensor are housed in a single shell, and double shell type ones in which, a generator and a condensor positioned on the high pressure side are housed in one single shell, and an evaporator and an absorber on the low pressure side are housed in the other shell. It is required in the double shell type refrigrators that there be mounted pipes for interconnecting the two shells, and the use of a large space. In addition, the double shell type refrigerators are disadvantageous as compared with the single shell type ones in that the former occupies a larger space than that of the latter and is expensive in manufacturing costs. In addition to this, the double shell type refrigerator requires cooling water pipes to be interconnected between the two shells, since cooling water is required for an absorber and condensor and it is a common practice that cooling water from the absorber is introduced into the condensor. As a result, the double shell type refrigerators suffers from a complicated construction, as compared with a single shell type.

On the other hand, the single shell type refrigerators have found a wider use than the double shell type ones. However, there arise the following requirements for an absorption type refrigerator in terms of thermal efficiency, operational efficiency and arrangement of pipings; firstly, heat transfer between the generator which is the highest in temperature, and the evaporator which is the lowest in temperature should be minimized; secondly, refrigerants in the form of vapor should be prevented from being accompanied by liquid dropplets thereof when passing from an evaporator to an absorber thirdly, in general, cooling water for a condensor and an absorber should flow in series; and fourthly, groups of heat transmitting piping should be arranged in a manner to avoid unwanted space within a shell. The prior art absorption type refrigerators have been unsatisfactory in terms of the above requirements.

SUMMARY OF THE INVENTION

It is an object of the present invention to provide an absorption type refrigerator whose components are arranged in a shell in a manner to minimize thermal leakage between an evaporator and a generator.

It is another object of the present invention to provide an absorption type refrigerator whose components are arranged in a shell in a manner to insure an increased effective area for an eliminator on the low pressure side.

In is a further object of the present invention to provide an absorption type refrigerator whose components are arranged in a shell such that respective cooling water headers may be used in common for a condensor and an absorber.

It is a still further object of the present invention to provide an absorption type refrigerator whose components are arranged in a shell in a manner to eliminate an unwanted space.

DESCRIPTION OF THE PREFERRED EMBODIMENTS

Figure 1:
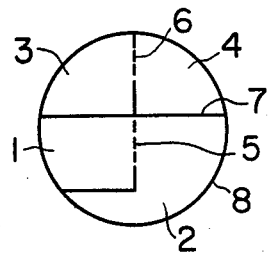
FIGS. 1, 2, 3, and 4 are diagrammatic views of various arrangements in shells of the prior art absorption type refrigerators.

In FIGS. 1 to 4, there are shown the prior art arrangements in a shell of a single shell type refrigerator. In the drawings, shown at 1 is an evaporator, at 2 an absorber, at 3 a condensor, at 4 a generator, at 5 an eliminator on the low pressure side, which is positioned between the evaporator 1 and the absorber 2. Shown at 6 is an eliminator on the high pressure side, which is positioned between the generator 4 and the condensor 3, at 7 a heat insulating wall positioned between the evaporator 1 and the absorber 2 as well as between the generator 4 and the condensor 3, and at 8 a shell which houses the evaporator 1, absorber 2, condensor 3 and generator 4 therein. In the refrigerator shown in FIG. 4, the heat insulating wall 7 also serves as a solution-receiving pan for the generator 4. Meanwhile, heat transmitting piping is provided for the evaporator 1, absorber 2, condensor 3 and generator 4, is omitted in the drawings for the purpose of clarity.

Figure 3:
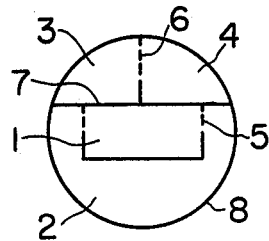
Figure 4:
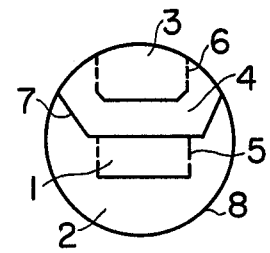

It is required in an absorption type refrigerator to minimize thermal leakage between the generator 4 which is the highest in temperature, and the evaporator 1 which is the lowest in temperature. This has a substantial influence on the performance of a refrigerator. With the refrigerators shown in FIGS. 3 and 4, however, the evaporator 1 is disposed adjacent the generator 4 with the heat insulating wall 7 therebetween, so that it is impossible to completely eliminate heat transfer through the heat insulating wall 7. Thus the arrangements shown in FIGS. 3 and 4 are not sufficiently prepared for thermal leakage.

Furthermore, with an absorption type refrigerator, it is required that refrigerants in the form of vapor, be prevented from carrying over liquid dropplets thereof when passing from the evaporator 1 to the absorber 2. In order to effectively prevent the vapor refrigerants from carrying over liquid dropplets thereof it is essential that the flow rate of the vapor of the refrigerants be reduced by increasing an effective area of an eliminator on the low pressure side.

However, the prior art refrigerators shown in FIGS. 1 to 4 fail to solve the aforesaid problem since, the effective areas of the eliminators on the low pressure side are small.

Still furthermore, it is general in adsorption type refrigerators that cooling water flows in series from the condensor 3 to the absorber 2. Therefore, in case such flow pattern is employed, it is advantageous from the viewpoints of manufacture and similicity of construction to use a single cooling water header in common for the condensor 3 and absorber 2. However, as shown in FIGS. 1 to 4, the condensor 3 is not disposed adjacent the absorber 2, which makes it unreasonable to use a cooling water header in common therefor.

Figure 2:
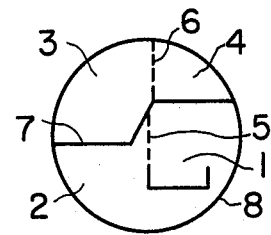

With absorption type refrigerators, it effectively contributes to making shells small-sized that heat transmitting piping be so arranged as to eliminate an unwanted space within a shell. However, the prior art refrigerators shown in FIGS. 2, 3, and 4 are arranged such that piping extends through the spaces on the opposite sides of the evaporator 1 to the absorber disposed therebelow. Accordingly, with the aforesaid arrangement, the spaces on the opposite sides of the evaporator 1 are inevitable, but are undesirable from the viewpoint of making a shell smallsiged.

Figure 5:
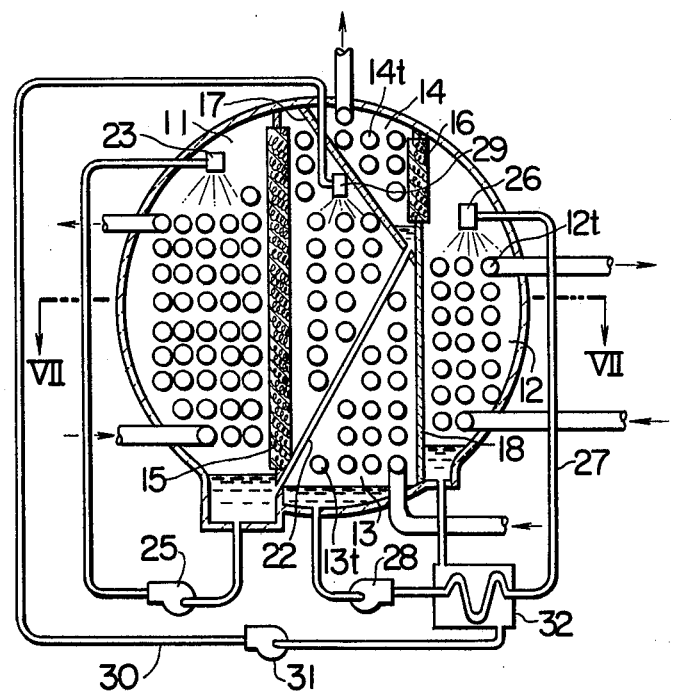
FIG. 5 is a view of an arrangement in a shell according to the most preferable embodiment of the invention.
Figure 6:
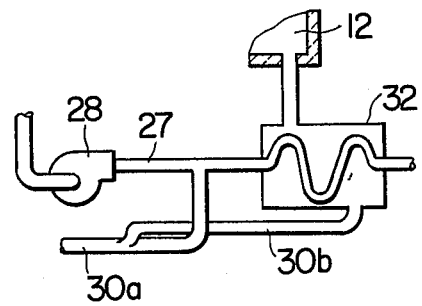
FIG. 6 is a view of part of a modified piping in a refrigerator according to the invention.
Figure 7:
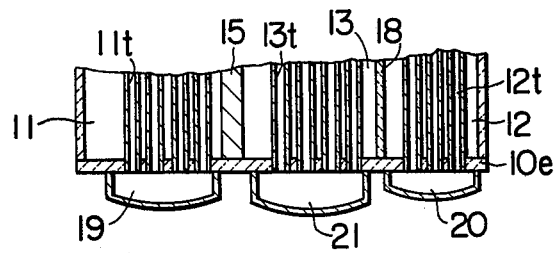
FIG. 7 is a cross-sectional view taken along the line VII—VII of FIG. 5.

In FIG. 5, there is shown the most preferable arrangement in a shell of an adsorption type refrigerator according to the present invention. FIG. 6 shows part of piping. FIG. 7 is a cross sectional view taken along the line VII—VII of FIG. 5.

A shell 10 is in the form of a cylinder having a circular cross section and made of a heat insulating material. The shell 10 is closed with end plates 10e at the opposite ends thereof. The contour, of the cross section of the shell 10 is not limited to a circle, but may be elliptic, egg-shaped, or of a closed curve consisting of a combination of a plurality of arcs. Positioned on the left side within the shell 10 is an evaporator 11 and on the right side a generator 12 with an absorber 13 and a condensor 14 being interposed between the evaporator 11 and the generator 12. A low-pressure-side eliminator 15 is interposed between the evaporator 11 and the absorber 13, while a high-pressure-side eliminator 16 is positioned between the generator 12 and the condensor 14. It is preferable that the low pressure side eliminator 15 be positioned in proximity to the center of the shell 10 so as to extend vertically over the longest length. A heat-insulating partition wall 17 is positioned between the absorber 13 and the condensor 14, while another heat-insulating partition wall 18 is provided between the absorber 13 and the generator 12.

The evaporator 11 includes a tube bundle 11t for circulating chilled water, the absorber 13 a tube bundle 13t for circulating cooling water, the condensor 14 a tube bundle 14t for circulating cooling water, and the generator 12 a tube bundle 12t for circulating a hot fluid such as steam.

The respective tubes of the tube bundle 11t are communicated with each other by means of a chilled water header 19, and the respective tubes of the tube bundle 12t are communicated with each other by means of a header 20. The tubes of the tube bundles 13t and 14t are communicated with each other by means of a common cooling water header 21. Although FIG. 7 shows only one side of the shell, it is to be understood that the headers 19, 20 and 21 are also provided on the opposite side. In case the number of flow paths of chilled water in the chilled water pipe group 11t is desired to be plural, partition walls are provided within the chilled water header 19. This may be applied to the cooling water pipe groups 13t and 14t, and heating pipe group 12t, as well.

The bottom portion of the condensor 14 is communicated through duct 22 with the bottom portion of the evaporator 11 to introduce a liquid refrigerant from the condensor 14 into the evaporator 11. A spray header 23 is mounted in the upper portion of the evaporator 11. A pipe line 24 is connected at its one to the spray header 23, and is connected at the other end to the bottom portion of the evaporator 11 with a refrigerant pump 25 mounted in the intermediate portion of the pipe line 24. Connected at one end to the spray header 26 is a pipe line 27 which is connected at the other end to the bottom portion of the absorber 13 with a circulating pump 28 mounted in the intermediate portion of the pipe line 27. A spray header 29 is disposed in the upper portion of the absorber 13. Connected at one end to the spray header 29 is a pipe line 30 which in turn is connected at the other end to the bottom portion of the generator 12. A heat exchanger 32 is mounted at the intersection of the pipe lines 27 and 30 with the pipe line 27 on the heat receiving side of the exchanger and the pipe line 30 on the heat discharging side of the exchanger.

Although the embodiment is described as having the respective pumps for the pipe lines 24, 27 and 30, a single pump will do in place of the circulating pump 28 and the spray pump 31. This can be practiced as shown in FIG. 6, in which a pipe line 30a connected at its one end to the spray header 29 and relieved of the spray pump 31 is connected to the pipe line 27 between the circulating pump 28 and the heat exchanger 32, and a pipe line 30b communicated through the heat exchanger 32 with the generator 12 is connected by way of an injector to the pipe line 30a.

Figure 8:
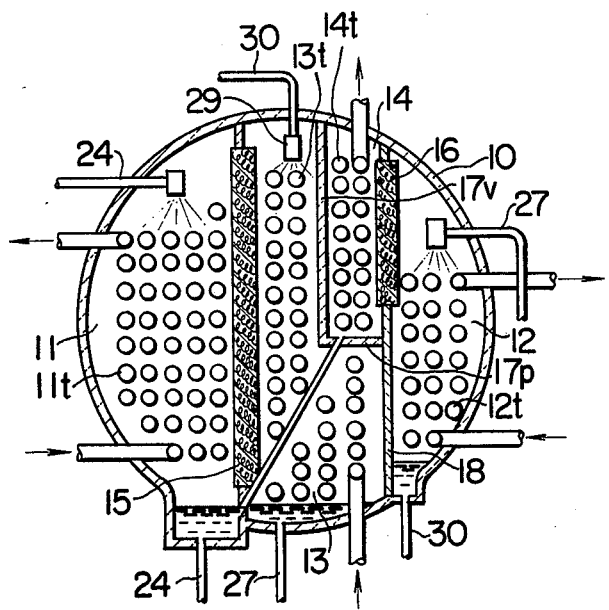
FIG. 8 is a view showing a modified arrangement in a shell according to the invention.

While the foregoing description has been given for a single effect absorption type refrigerator, the present invention can be applied to a double effect absorption type refrigerator. The double effect absorption type refrigerator as used herein comprises a single effect absorption type refrigerator combined with a high temperature generator and a high temperature side heat exchanger, and the aforesaid components are well-known. Accordingly, the features of the present invention can be readily understood without any detailed explanation of a double effect absorption type refrigerator, in which the present invention is practiced. Meanwhile, while a spray type generator is employed in the embodiment described above, a flooded type generator may be used. FIG. 8 is a cross sectional view of a modification of the arrangement in a shell shown in FIG. 5, and the portions omitted are the same as those in FIG. 5. In addition, a horizontal cross sectional view through the center of the refrigerator in FIG. 8 the same as that shown in FIG. 7. The arrangement in the shell shown in FIG. 8 is different from that which the heat insulating partition wall 17 positioned of FIG. 5 is between the condensor 14 and the absorber 12 consists of a vertical portion 17v and a horizontal portion 17p of L-shape.

In operation, a heating fluid or steam is supplied into the heating pipe bundle 12t then the pumps 25, 28 and 31 are actuated to direct refrigerant and solutions. Then, a weak solution sprayed from the spray header 26 is heated by the heating pipe bundle 12t, to vaporize a refrigerant. The refrigerant thus vaporized is passed through the high-pressure-side eliminator 16 to be relieved of liquid dropplets therefrom, and is introduced into the condensor 14. The vaporized refrigerant thus introduced into the condensor 14 is cooled by means of the pipe bundle 14 for cooling water to be condensed, and the resulting liquid refrigerant is collected in the bottom portion of the condensor 14. The condensed refrigerant collected in the bottom portion of the condensor 14 is then fed through the pipe line 22 to the bottom portion of the evaporator 11 to be collected therein. The condensed refrigerant thus collected in the evaporator 11 is then fed under pressure through the pipe line 24 to the spray header 23 by means of the refrigerant pump 25, and then sprayed from the spray header 23 to the chilled water pipe bundle 11t.

The liquid refrigerant thus sprayed receives evaporation-latent heat from the chilled water flowing through the pipe bundle 11t to be vaporized. The chilled water, from which the evaporation-latent heat has been taken out, is lowered in temperature to thereby attain the intended object in the refrigerator. The refrigerant which has been evaporated in the evaporator 11 is then passed through the low-pressure-side eliminator 15 to be relieve of liquid dropplets and then flows into the absorber 13.

On the other hand, strong solution, obtained after a vapor refrigerant has been developed, is then fed under pressure through the pipe 30 to the spray header 29 by means of the spray pump 31, and then sprayed from the spray header 29. The strong solution which has been sprayed from the spray header 29, in the course of its dropping, is brought into contact with vapor refrigerant which is being introduced through the low-pressure-side eliminator 15 into the absorber 13, as has been described earlier, thereby absorbing a vapor refrigerant which has been liquified by the cooling water flowing through the cooling water pipe group 13t to provide a weak solution which in turn is collected in a bottom portion of the absorber 13. In this respect, the strong solution is subjected to cooling due to cooling water flowing through the cooling water pipe group 13t, thereby affording an effective absorbing action.

The weak solution collected in a bottom portion of the absorber 13 is fed under pressure through the pipe 27 to the spray header 26 by means of the circulating pump 28.

What is claimed is:

1. An absorption type refrigerator comprising:
   a shell,
   an evaporator disposed in a first space of the interior of the shell,
   a generator disposed in a second space of the interior of the shell,
   an absorber arranged in a third space of the interior of the shell,
   a condenser arranged in a fourth space of the interior of the shell,
   and connecting means operatively connecting said evaporator, generator, absorber, and condenser to effect an absorption refrigerating cycle,
   said first and second spaces being disposed at respective opposite locations in said shell with said third and fourth spaces disposed between said first and second spaced without any common boundary wall between said first and second spaces, thereby thermally isolating said evaporator and generator from one another,
   said fourth space being delimited in part by a first partition wall also delimiting a portion of said second space, said fourth space being separated from said first space by portions of said third space without any common boundary wall between said fourth and first spaces.

2. A refrigerator according to claim 1, wherein said first partition wall is constructed as a high pressure-side eliminator.

3. A refrigerator according to claim 1, wherein a low pressure-side eliminator forms a second partition wall defining the boundary between said first and third spaces.

4. A refrigerator according to claim 3, wherein said low pressure-side eliminator extends vertically substantially across the full extent of said shell at a location close to the center of the shell, whereby the total area of said low-pressure side eliminator is maximized within said shell.

5. A refrigerator according to claim 4, wherein said shell is cylindrically shaped with said low pressure-side eliminator extending vertically substantially diametrically across the shell.

6. A refrigerator according to claim 4, wherein said first partition wall is constructed as a high pressure-side eliminator.

7. A refrigerator according to claim 3, wherein said third space is further delimited by a third partition wall bordering also on said fourth space and a fourth partition wall bordering also on said second space, said third and fourth partition walls being constructed as heat insulation walls.

8. A refrigerator according to claim 5, wherein said third space is further delimited by a third partition wall bordering also on said fourth space and a fourth partition wall bordering also on said second space, said third and fourth partition walls being constructed as heat insulation walls.

9. A refrigerator according to claim 1, wherein said connecting means includes headers for cooling water pipe bundles in said absorber and condenser, said headers being formed integrally with one another.

10. A refrigerator according to claim 8, wherein said connecting means includes headers for cooling water pipe bundles in said absorber and condenser, said headers being formed integrally with one another, said headers being disposed at the underside of said cylindrically shaped shell.

11. A refrigerator according to claim 1, wherein said third space is bounded at one side thereof by a common partition wall with said first space and at the opposite side thereof by a common partition wall with said second space.

12. A refrigerator according to claim 7, wherein said third partition wall is a single straight wall extending from the inside surface of said shell to said fourth partition wall.

13. A refrigerator according to claim 7, wherein said third partition wall includes a vertical section extending downwardly from the inside surface of said shell and a horizontal section extending from the bottom of said vertical section to said fourth partition wall.

14. A refrigerator according to claim 7, wherein a duct connecting the bottom of said fourth space with the bottom of said first space extends across said third space.

* * * * *